(12) United States Patent
Ortiz

(10) Patent No.: US 10,522,044 B2
(45) Date of Patent: Dec. 31, 2019

(54) DISPATCH PLATFORM FOR ROAD, TRAVEL, OR HOME ASSISTANCE

(71) Applicant: Connect Road Assists, LLC, San Juan, PR (US)

(72) Inventor: Antonio J Ortiz, San Juan, PR (US)

(*) Notice: Subject to any disclaimer, the term of this patent is extended or adjusted under 35 U.S.C. 154(b) by 0 days.

(21) Appl. No.: 16/017,596

(22) Filed: Jun. 25, 2018

(65) Prior Publication Data
US 2018/0374363 A1 Dec. 27, 2018

Related U.S. Application Data

(60) Provisional application No. 62/524,207, filed on Jun. 23, 2017.

(51) Int. Cl.
| | |
|---|---|
| *H04W 24/00* | (2009.01) |
| *G08G 1/00* | (2006.01) |
| *G07C 5/00* | (2006.01) |
| *G06Q 10/06* | (2012.01) |
| *G06Q 20/14* | (2012.01) |
| *H04W 4/02* | (2018.01) |
| *G08G 1/13* | (2006.01) |
| *G06Q 50/30* | (2012.01) |

(52) U.S. Cl.
CPC ...... *G08G 1/202* (2013.01); *G06Q 10/063112* (2013.01); *G06Q 20/14* (2013.01); *G07C 5/008* (2013.01); *G08G 1/13* (2013.01); *H04W 4/02* (2013.01); *G06Q 50/30* (2013.01)

(58) Field of Classification Search
CPC ........ G08G 1/202; G08G 1/205; G08G 1/207; G06Q 10/063112; G06Q 50/30; G06Q 20/14; G07C 5/008; H04W 4/02
USPC ..................................................... 455/456.3
See application file for complete search history.

(56) References Cited

U.S. PATENT DOCUMENTS

2003/0087648 A1* 5/2003 Mezhvinsky ....... G06F 17/3087
455/456.1

* cited by examiner

*Primary Examiner* — Huy C Ho
(74) *Attorney, Agent, or Firm* — Eugenio J. Torres-Oyola; Victor M. Rodriguez-Reyes; Ferraiuoli LLC

(57) ABSTRACT

The following application is related to the fields of dispatching vehicles on the basis of location; monitoring the location of vehicles belonging to a group; and/or registering the workings of vehicles communicating information to a remotely located station.

15 Claims, 4 Drawing Sheets

DISPATCH PLATFORM FOR ROAD, TRAVEL, OR HOME ASSISTANCE

PRIORITY

This application claims priority from U.S. Provisional Patent Application No. 62/524,207, filed on Jun. 23, 2017.

BACKGROUND

The following application is related to the fields of dispatching vehicles on the basis of location; monitoring the location of vehicles belonging to a group; and/or registering the workings of vehicles communicating information to a remotely located station.

Dispatch of services currently requires the use of several independent non-integrated platforms that contain data and applications necessary to coordinate the logistics of assistance services. One such assistance service that requires the use of a complex web of independent solutions is roadside assistance services.

Roadside assistance services have become popular services that are, in several instances, offered by or bundled with other products or service, for example, auto insurance, auto club memberships, or new vehicle factory warranties. Roadside assistance services can include breakdown assistance for motorists, tire replacement, towing, battery jump start, unlocking of doors and providing emergency fuel delivery.

In one explanatory scenario, a company dispatching a service would initiate a request for service receiving a client's call through a call center. A service coordinator in the call center will retrieve the call from a queue. After obtaining identification data from the client, the service representative will open an application, such as Salesforce CRM®, containing a database of the company's clients and the clients' information. Using this application, the service coordinator will be able to obtain the necessary client information to dispatch the service, such as automobile make, model, license plate, color, and insurance coverage.

The service coordinator needs to determine the optimal service provider to dispatch one that is available, nearby, and capable of providing the service required by the client. More likely than not, the only tool in the service coordinator's arsenal is a phone call to one or more of the service providing companies. Because it is industry practice to outsource the fulfillment of the services to third parties, the dispatching service company will not have its own service providers and all coordination needs to go through an intermediary, namely managers at the service provider companies. This will require the service coordinator to pull up another application containing the contact data and service capabilities of its service provider network.

However, most likely than not, service provider managers will not be able to provide the necessary detail as to the whereabouts and status of their own service providers. The decision of choosing the service provider then boils down to "guesstimates" by the service coordinator or service provider managers.

This process can be even more complex when the service provider companies have negotiated different fees and/or costs with the dispatch service company. In those cases, the service dispatching company will need to look up another database including costs and/or fees to be able to provide the client with any cost information for the service required and to properly account for the incurred cost in all services fulfilled. In some cases, where the cost and/or fees are determined by the distance traveled by the service provider, the dispatch service company will have to call the service provider after the service is complete to obtain the mileage information and manually input this information into their system for billing. Because this data is determined after the fact, the original quote for services rendered to the client may need to be revised.

Furthermore, in some cases a client's roadside assistance coverage may include only a certain amount and/or type of services. In those cases, a service coordinator will need to access another application to determine the coverage language and deductibles, exclusions and/or limitations for that particular client before providing the quote for services to the client.

In other circumstances, the person calling to request a service might not be a current client. The service coordinator might need to open a different application to obtain general and/or enrollment information from the new client.

In other instances, the service coordinator might wish to or need to offer a client to reenroll or upgrade its coverage, and might also need to open another application to complete the reenrollment or upgrade process.

Further, in some cases, road assistance service companies are risk bearing entities that need actuarial and statistical data and analysis to model the costs for the services and their offerings. Additionally, road assistance companies may be required by law to maintain financial reserves to account for the risk associated with the services.

In other instances, road assistance service companies, auto insurance, auto club, or car companies may need to audit car breakdown data or dispatched service data to determine loss ratio of the services or products offered. A platform that integrates all of the applications described above would support such needs.

Therefore, there is a need for a platform that allows efficient, fast, coordinated and automated dispatching of services.

DESCRIPTION OF THE PRIOR ART

None of the systems and methods related to roadside assistance in the prior art are directed to streamlining the process of assigning a service provider to a client efficiently based on a client's coverage. For example, U.S. Pat. No. 9,282,430 discloses allowing individuals to register as service providers and bidding on providing services when a user requires assistance. The system collects information about users based on sensors and prioritizes the available service providers based on various information obtained from the sensors. However, this system is isolated and does not does not allow for handling all the tasks related to assigning a service provider to a user in an efficient manner, as all of its functionalities are automated based on recorded data and there is no supervision of the request by a human.

U.S. Pat. No. 6,892,131 is directed at monitoring dispatched vehicles from the management offices. This system allows for gathering information about the status of a job for which a vehicle has been assigned so response time can be improved. However, this system cannot handle tasks such as payment, verifying insurance coverage, or establishing communication between the requester and the driver.

U.S. Pat. No. 9,384,491 discloses a mobile system for members of a roadside assistance program can access their accounts and request assistance based on their membership benefits. Dispatch of assistance is done by the user selecting the type of request and a server determining service providers compatible with said request. However, this system cannot be used by a service coordinator in order to change the service request properties as required in particular occasions.

BRIEF SUMMARY

The following application discloses a method and system, like a dispatch platform or a web-based tool, for dispatching road, travel and home assistance services. It provides a solution for the current problem of having several platforms opened and running to be able to dispatch a service quickly.

In some embodiments the dispatch platform integrates payment gateways, softphones, GPS tacking, databases, smart automated dispatching and more, all in one platform. The databases may include information such as client information, account information, service providers' information, service requests information and payment information.

In some embodiments the dispatch platform integrates a mobile application for providers (hereinafter, the provider app) that will allow to track the provider's location, send the service information to them, and get feedback from the provider as to the status of the service.

In some embodiments the provider app comprises a chat module where service providers can communicate with service coordinators at any time.

In some embodiments the dispatch platform integrates a web-based screen where the client will be able to view service information, including a map with the location of the service provider driver.

In some embodiments the dispatch platform uses Geo-Text technology to locate the client's exact location.

In some embodiments the dispatch platform automatically assigns service providers by availability, rating and type of vehicle/service needed.

In some embodiments the dispatch platform comprises GPS tracking of service providers.

In some embodiments the dispatch platform automatically provides job status assignment by the use of geo-fencing.

BRIEF DESCRIPTION OF THE DRAWINGS

FIG. 3 illustrates an exemplary embodiment of the dispatch platform's client database screen.

FIG. 4 illustrates an exemplary embodiment of the dispatch platform's interface for manually entering client information.

DETAILED DESCRIPTION

Figure 1:
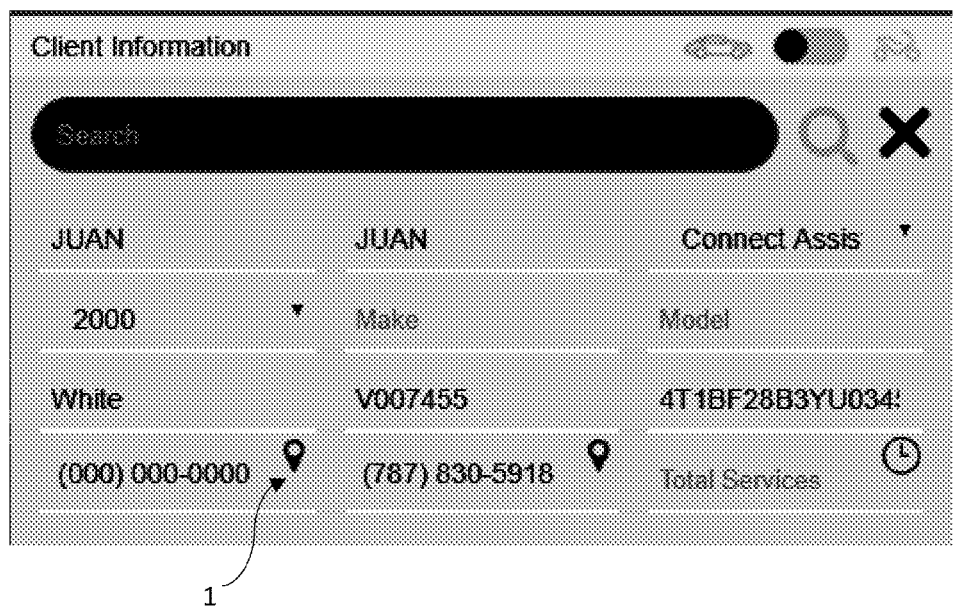
FIG. 1 illustrates an exemplary embodiment of the dispatch platform's client information interface.

As shown in FIG. 1, in one embodiment, the dispatch platform will have a button 1 next to each of the client's phone numbers that when pressed by the service coordinator, will automatically send a text message with a link to the client's phone. This functionality could be provided through the integration of applications such as Geo-Text. In this embodiment, the service coordinator is able to choose to which phone number the geo-text should be sent based on the client's preference and/or any other basis. Geo-Text refers to requesting and receiving location information through SMS or other text-messaging or instant-messaging services.

Figure 2:
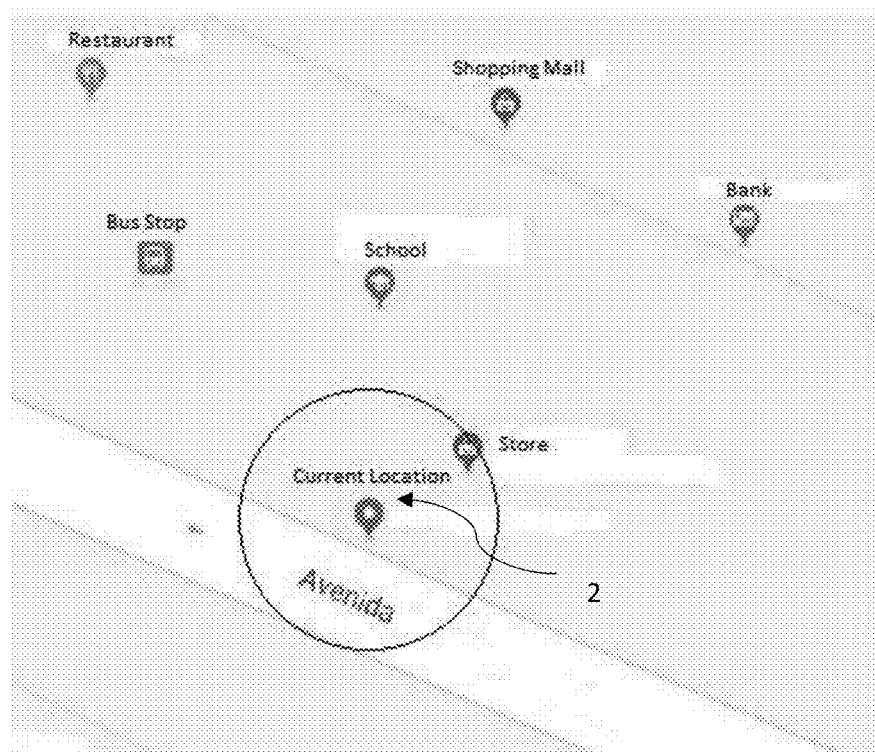
FIG. 2 illustrates an exemplary embodiment of the dispatch platform's map screen.

Continuing with the current embodiment, the client will have to agree, through the link received in a text or instant message, to share his/her location with the company providing the dispatch platform. In this embodiment, when the client clicks on the link, the browser is directed to a website that is operatively connected to the platform. The platform is then able to obtain the client's location by identifying the internet protocol (IP) address or accessing the mobile device's GPS module. The IP address or GPS data is then transformed into coordinates used by the platform. In one embodiment, the link sent to the client could only be functional for a limited time, for security purposes. As shown in FIG. 2, the dispatch platform will automatically receive the client's location and will auto populate it in the map displayed 2 in the dispatch platform, allowing smart automated dispatching. The location data can also be shared with the service provider for real-time tracking of the client's location during the service period.

Figures 3, 4:
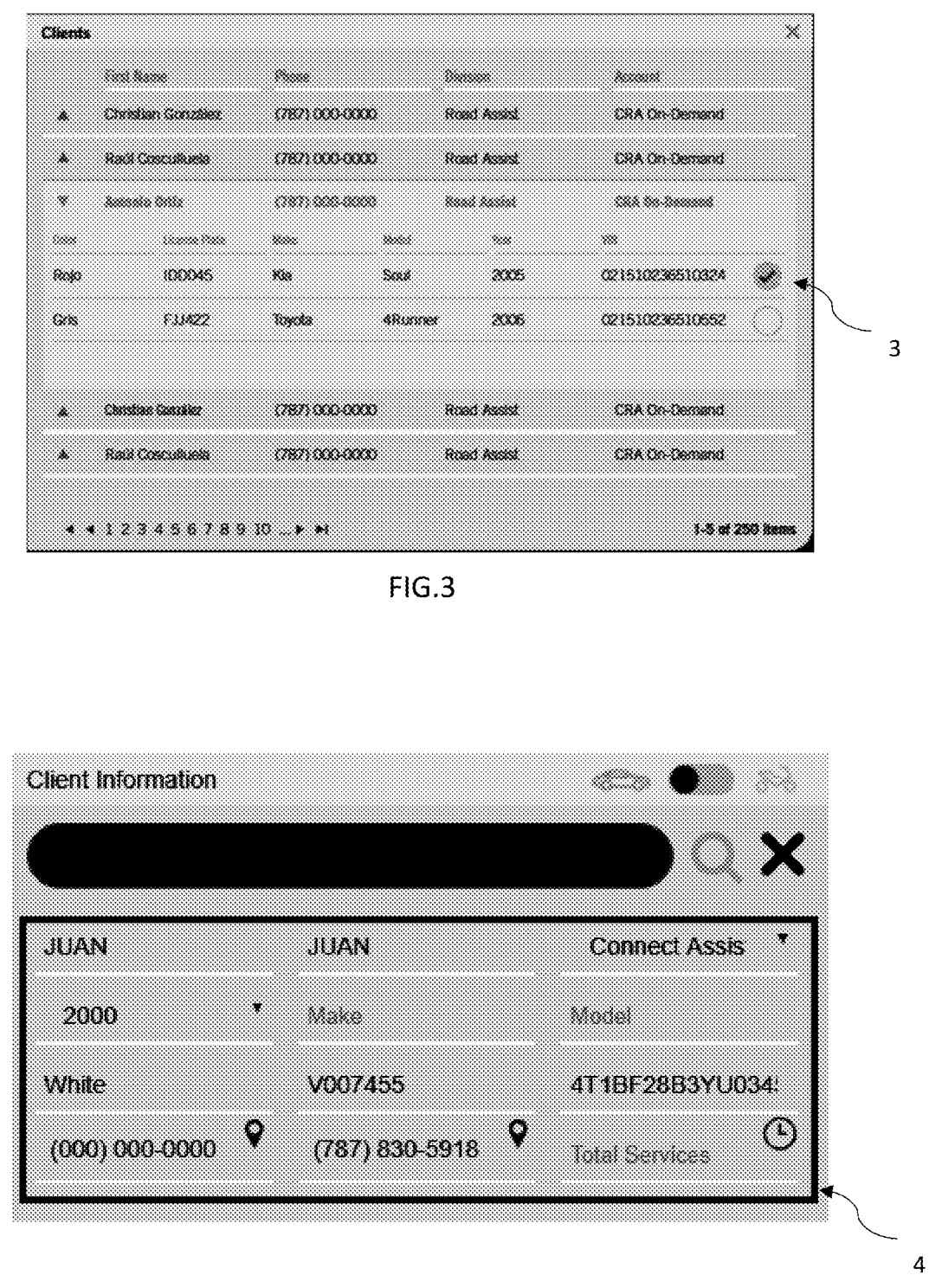

In another embodiment, when a call is received, if the number is in the database, the dispatch platform will automatically perform the functions of searching for the client and displaying the client's name and account information, as seen in FIG. 3. In this embodiment, a softphone type or similar application display will appear in the dispatch platform. If there is only one vehicle or home in the database, the dispatch platform will auto-populate the client's information. If the client has more than one vehicle, one of the vehicles can be flagged as "favorite" or "main" vehicle 3, so that vehicle's information is auto populated. The service coordinator may change the vehicle manually when the auto populated information is not the one required.

In another embodiment, service coordinators will see status of other service coordinators allowing them to transfer calls easily. In one embodiment, the dispatch platform will also comprise an address book where service coordinators will be able to have fast access to provider's phone numbers. In one embodiment, the platform includes a database of the services that can be performed by each provider. When the service provider is assigned, the phone number of the provider will be auto-populated in the soft-phone type or similar application when selected by the service coordinator.

In another embodiment, the dispatch platform comprises an integration database. If the client information is not auto-populated when the call is received (for example because the phone number the client is using is not in the data base), the service coordinator can search for the client in the dispatch platform, then choose which vehicle or home needs assistance. Once this is selected, client information is cross-referenced to any identifier entered by the service coordinator (for example, home address, or car information), and client's information will be auto-populated. The new phone number can also be added to the client's account.

In another embodiment, the following information is auto populated: client's contact information, client's account, client's vehicle information (for road assistance), client's home information (for home assistance), total services, and history for the client. Once the client's information is displayed, if the contact information is incorrect, it can be corrected directly in the dispatch platform and the database will be updated.

FIG. 4 shows an embodiment where if the client is not in the database (for example, because he/she is not a current client), the client's information 4 is entered in the dispatch platform by the service coordinator. In one embodiment, once the service is submitted, the client will be added to the database automatically. In another embodiment, if a new client calls and the service is not submitted, the information of the client can still be saved in the database in case the clients calls again.

In another embodiment the dispatch platform allows automatic assignment of service providers. In this embodiment, each service provider will have the dispatch platform application (provider app). When the dispatch platform identifies the location of the client, it will automatically find the service provider and the service that needs to be assigned to the provider.

Figures 5, 6:
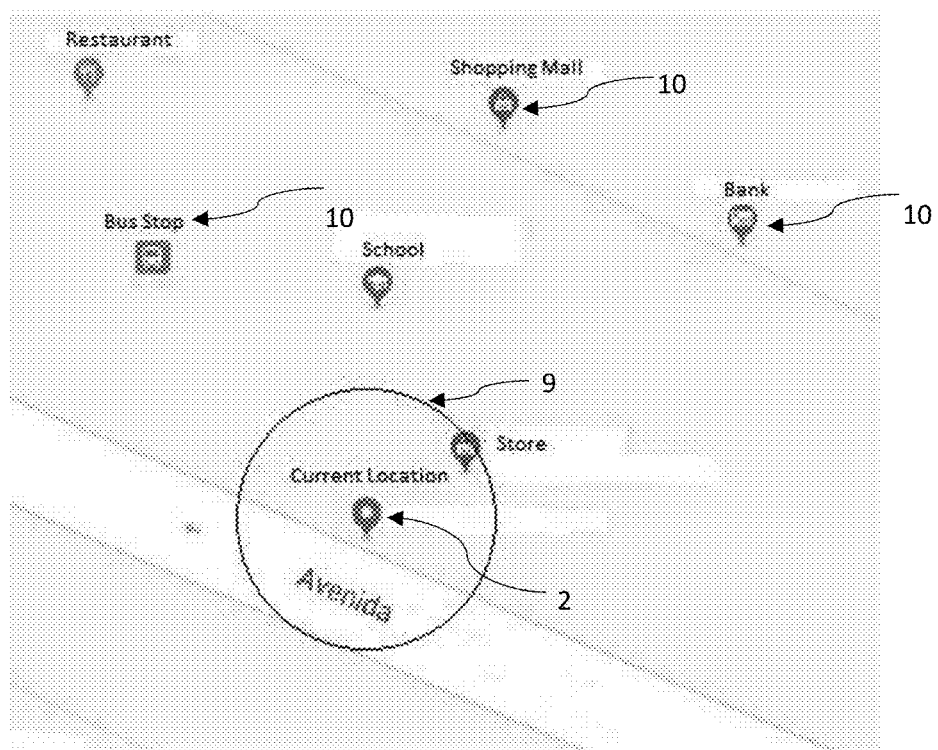
FIG. 5 illustrates an exemplary embodiment of the dispatch platform's provider database screen.
FIG. 6 illustrates an exemplary embodiment of the dispatch platform's geo-fencing functionality.

In this embodiment, as shown in FIG. 5. the dispatch platform will have the information of the different drivers, including: Distance based on GPS location coordinates 5, status of the driver (busy, free or finishing) 6, type of vehicle the driver is using in order to know what type of service it is prepared to give 7, and client service rating of each driver 8. In other embodiments, the dispatch platform may include other information, such as how many passengers the driver can transport.

In this embodiment, the dispatch platform, using an algorithm, will automatically assign a driver to the service taking into consideration: distance to the client, provider service rating, type of service needed, number of persons in the client's vehicle, and status of the driver. In one embodiment, the platform first determines the providers available within a given radius from the client. Then, the platform determines, from those providers in the given radius, which of them can provide the services required. Then, the platform determines, based on the distance from the client and the status of those providers (that is, whether they are busy, free or finishing) what is the estimated time of arrival (ETA) to the client's location. The platform then assigns the provider based on the lowest ETA.

In one embodiment, the platform can be programmed to include the additional criteria of client rating of the provider. When the platform determines that the ETA between more than one provider is less than a determined amount of time, for example, but not limited to, 2 minutes, the platform can automatically choose the provider based on client rating and not only on ETA. Further embodiments can assign a provider based on other information such as insurance coverage or price.

In one embodiment, the platform can be programmed to estimate the status of the provider based on the service it is currently providing and the ETA from the client. For example, when a provider has already arrived at the client's location and the service being provided is, for example, unlocking the car door, based on previous experience recorded in a platform's database, it could determine that the provider will complete the service in, for example, 2 minutes. This estimate will allow the platform to use a (3) three tier provider status display, wherein the application uses red, yellow or green to illustrate the estimated provider status depending on whether the provider is just beginning with the service, in the middle of it, or finishing. This feature allows more efficient provider management and speedier client service without requiring any input or response from the provider.

In one embodiment, the platform comprises a database that includes the costs and/or fees negotiated with each provider. After determining the most appropriate providers according to the process established above, the platform can be programmed to use the cost and/or fees database to automatically select, between several providers in similar conditions, the provider with the lowest cost and/or fees.

In another embodiment, the platform allows the editing of services requested, when, provider assistance allows for a lower level service than originally required. For example, if a client requested towing services, but the provider is able to establish that only battery charging services are needed, the provider may modify the service provided through the app. In this embodiment, several problems may arise when the service has been charged to the client's account but the service is edited afterwards. Therefore, in one embodiment, the platform may delay charging the client's account until the service has been completed, by using geo-fencing as described below. In one embodiment, the platform may perform a credit card authorization check to the client's credit card on account, previous to or concurrently with the assignment of a service to provider.

In another embodiment, the dispatch platform allows for home assistance, services that can be assigned as an "emergency", which will assign a provider and the service will be dispatched immediately or the service can be scheduled for a future day and/or time if not an "emergency".

In this embodiment, for scheduled services, the client will receive two text messages, first message when the service is coordinated, and the second text message as a reminder before the service. In one embodiment, the first text message will include a calendar invite in order to give the client the option to download the event to his/her calendar.

In another embodiment the dispatch platform will have an area available for notes to be used by service coordinators, where they can add comments and notes and these will be saved in the database. In one embodiment, the notes will be stamped with the coordinators name and the time the note was written. In one embodiment, these notes will be available for service providers in the provider app. In another embodiment, the service provider app has an area available for provider notes which can be available to the service provider through the platform.

In another embodiment the dispatch platform will comprise a payment processor. In this embodiment, the dispatch platform will automatically calculate the cost of the service that is being coordinated. It will look up the type of service, the provider, costs and/or fees associated by such provider, client account and applicable coverage account, amount of previous services per client and distance (if applicable) to perform the calculation.

In this embodiment, if the client has to pay, the dispatch platform will automatically open the payment processor screen when the service is submitted. In one embodiment, the payment processor will have the following payment options for the clients: credit card, cash and gift (free services when approved by management). In this embodiment, when credit card is chosen, the service coordinator will take the client's card information, populate it on the payment processor and the client will be charged when submitted. In one embodiment, the platform stores the calculations in case of any complaint by the client and/or is able to generate and store a receipt.

In another embodiment, the dispatch platform comprises a mobile application for service providers (provider app). In this embodiment the provider app fully communicates with the dispatch platform, which might be, for example, a desktop version. In one embodiment, the provider app will receive information of the services assigned to them. In one embodiment, the provider app comprises the following functionality: client's location and utilize the application as a GPS, service details like client's vehicle's information or home information, capacity to call the client directly (without having access to their phone numbers), recording of the calls with the clients, ability to take pictures and upload them to the database, chat or call service coordinators at any time, ability to record these calls, calls and chat conversations will be saved in the dispatch platform's database, change the vehicle type that the service provider is driving, view past services, view notes written by service coordinators, add notes that can be seen by the service coordinators, prepare a condition report of the vehicle when needed, and allow the dispatch platform to track service provider's drivers with a GPS.

In another embodiment the dispatch platform comprises a geo-text and GPS functionality that allows Geo-Fencing; that is, the creation of virtual geographic boundaries 9 around an area by means of GPS, as shown in FIG. 6. Geo-Fences will allow the dispatch platform to receive data from the services provided or to be provided. For example, geo-fencing allows the platform to know the status of the service by comparing the location of the client 2 with the location of the driver and the location of the driver with the destination. Dispatch platform will automatically assign the following status to the service: "on route", "arrived", "on route to destination" and "finished". For example, if the provider vehicle is stopped within a perimeter 9 less than 30 feet from the client, the platform can be configured to conclude that the provider has "arrived". This status can be periodically updated by the platform automatically, or the service coordinator can use information obtained from the geo-fence to update status manually or make other decisions, such as sending a new provider or adjusting the fee. In another example, if, after arriving to the client's location, the provider vehicle exits the 30 feet perimeter 9, the platform can be configured to conclude that the provider has "finished", depending on the type of service previously assigned. Status information can be used to determine provider availability for a new assignment, so service coordinators and clients can use it as a factor in deciding which provider to send. For example, if three providers are available, but one provider with a higher rating than those three is about to finish his current assignment, the client could opt for waiting until the provider with the higher rating is finished. Geo-fences are determined using map data obtained from external sources, such as Google Maps. The received map data allows for establishing a virtual perimeter 9 around the client's location 2, taking into account the neighborhood, amount of people regularly in the area, traffic, number of traffic lights, and other factors that help maximizing the accuracy of the information determined from the service data obtained using the virtual perimeter.

In another embodiment, the system comprises several modules, including a module for establishing a geographical service area using geo-fencing. Based on the location information received from the client, the system determines the geographical area where the client is located 2. Based on the geographical area where the client is located, the system gathers data relevant to providing service in an efficient manner, such as surrounding places, traffic, weather, type of streets, and others 10. This data allows the operator to find the appropriate service provider for each occasion. Based on the gathered data, the system can establish a virtual perimeter 9 around the physical location of the client, in order to be able to obtain data related to the status of the service. For example, if the service provider is inside the virtual perimeter, the service status is "in progress," if the provider is outside of the virtual perimeter, the service status is "on the way." The size of the virtual perimeter is determined on a case-by-case basis, adjusting it depending on the current conditions of the geographical area where the service will be provided. This allows the system to provide accurate information so the service coordinator can take action in a more efficient manner.

Figure 7:
FIG. 7 illustrates an exemplary embodiment of the dispatch platform's dashboard screen.

In another embodiment, in addition to the service coordinators main screen, the dispatch platform will have a dashboard where all services will be displayed, as shown in FIG. 7. In this embodiment the dashboard will allow coordinators to have live information of all the services running. In one embodiment, the information on the dashboard will comprise: service number, status, time the service has been running, service coordinator, ETA, account, type of service, geographic location of the client, and provider. In one embodiment, the dashboard will also have the option of expanding the service to see more information: cost of the service, client's information, pictures from service providers, notes from service providers, map with locations of client and service provider driver.

There are several advantages of using ETA as a criteria instead of distance. Because distance does not take into account traffic and provider status, ETA is a more accurate and efficient means to ensure the fastest and more reliable service to the client. The ETA can be calculated using external map data sources that include traffic information like Google Maps.

In one embodiment an edit option will allow the coordinator to edit destinations, costs, distance, change providers, and any other information. In another embodiment, a cancel option will allow the service coordinator to cancel the service after submitted and provide the client with a refund.

In another embodiment, the dispatch platform and the provider app comprise a chat functionality, where all service coordinators and service providers will be able to communicate with each other. The dispatch platform chat will facilitate the communication between the service coordinators and the service providers since the service coordinators can be on the phone while communicating with one or more service providers. All of these conversations will be saved at a database automatically for future reference, if needed.

In another embodiment, the dispatch platform will also have a chat functionality for the client. Clients will be able to chat with service coordinators once the client receives the link.

In another embodiment, once the service provider driver is chosen, the client will receive a link by text to a web-based screen where the client will be able to: view a map with the location of the service provider driver and his/her location, view a picture of the service provider driver and its equipment, view the ETA, have the option to chat with the service coordinators, have the option to call the service coordinators, have the option to share the screen with friends or family. In one embodiment, once the service is changed to finished, the link will no longer be valid, and the client will not have access to the service provider's location or information.

In another embodiment, once the service is completed, a survey for client service will be sent to the client where the client will give an assessment of the service. In one embodiment, the assessment comprises the following: service provider, service coordinator, equipment, and response time. In this embodiment, the assessment information is used by dispatch platform and/or the company to evaluate employees and assign future services.

While the disclosure includes reference to specific embodiments, it will be understood by those skilled in the art that various changes may be made and equivalents may be substituted for elements thereof without departing from the true spirit and scope of the disclosure. In addition, many modifications may be made without departing from the essential teachings of the disclosure. When reference is made to specific known applications or systems, it will be understood by those skilled in the art that various substitutes and alternatives may be available.

What is claimed:

1. A service provider dispatch system, comprising:
a plurality of databases;
a softphone software interface;
one or more computer readable storage devices;
a processor;
program instructions stored on the one or more computer readable storage devices for execution by at least one of the one or more computer processors, the stored program instructions comprising:
program instructions for determining location information of a device;
program instructions for establishing a geographical service area;
program instructions for gathering service data based on said geographical service area;
program instructions for determining available service providers based on said service data;
program instructions for periodically establishing a status of service based on said service data and said location information of a device;
program instructions for receiving map data from an external source;
program instructions for receiving, by said one or more computer processors, location information and map data and establishing a virtual perimeter around a physical location based on said location information of a device and said map data;
program instructions for increasing or decreasing an estimated time of arrival based on said virtual perimeter and said service data based on said geographical service area.

2. The service provider dispatch system of claim 1, wherein said plurality of databases comprise data related to clients account information, service providers, service requests, and payment information.

3. The service provider dispatch system of claim 1, wherein said softphone module is configured to send call data to said one or more computer processors.

4. The service provider dispatch system of claim 1, wherein said service data comprises available service providers, ETA, type of service and service fee.

5. The service provider dispatch system of claim 1, wherein said stored program instructions further comprise program instructions to send a text message requesting location information.

6. The service provider dispatch system of claim 1, wherein stored program instructions further comprise program instructions to send an instant message requesting location information.

7. The service provider dispatch system of claim 1, further comprising a payment processing module.

8. The service provider dispatch system of claim 1, wherein client information can be added manually to said plurality of databases.

9. A method for dispatching service providers by performing the steps of:
receiving a service request through a softphone software interface;
determining location information of a device;
establishing a geographical service area;
gathering service data based on said geographical service area;
determining available service providers based on said service data;
periodically establishing a status of service;
establishing a refined estimated time of arrival;
wherein establishing a geographical service area comprises receiving location information of a device and establishing a virtual perimeter around a location of said device based on said location information and said service data; and
wherein establishing said estimated time of arrival comprises gathering an original estimated time of arrival from an external source and decreasing or increasing said original estimated time of arrival based on said virtual parameter and said service data based on said geographical service area.

10. The method of claim 8, wherein data from said softphone is used to retrieve client information from a plurality of databases.

11. The method of claim 8, wherein said plurality of databases comprise data related to clients account information, service providers, service requests, and payment information.

12. The method of claim 8, wherein said service data comprises available service providers, ETA, type of service and service fee.

13. The method of claim 8, wherein determining location information is requested by sending a text message.

14. The method of claim 8, wherein determining location information is requested by sending an instant message.

15. The method of claim 8, further comprising the step of a processing service payment.

* * * * *

UNITED STATES PATENT AND TRADEMARK OFFICE
CERTIFICATE OF CORRECTION

| | |
|---|---|
| PATENT NO. | : 10,522,044 B2 |
| APPLICATION NO. | : 16/017596 |
| DATED | : December 31, 2019 |
| INVENTOR(S) | : Antonio J. Ortiz |

It is certified that error appears in the above-identified patent and that said Letters Patent is hereby corrected as shown below:

In the Claims

Claims 10-15 read:
"The method of claim 8,"
Should read:
"The method of claim 9,"

Signed and Sealed this
Thirtieth Day of January, 2024

Katherine Kelly Vidal
*Director of the United States Patent and Trademark Office*